United States Patent [19]

Dubey

[11] Patent Number: 4,673,122

[45] Date of Patent: Jun. 16, 1987

[54] METHOD AND APPARATUS FOR REPAIRING COPPER PIPES

[76] Inventor: Thomas W. Dubey, 2601 Lower Roswell Rd., Marietta, Ga. 30062

[21] Appl. No.: 865,847

[22] Filed: May 22, 1986

[51] Int. Cl.⁴ ............................................. B23K 31/00
[52] U.S. Cl. .................................. 228/119; 432/225; 285/15
[58] Field of Search ................ 228/119, 253; 432/225, 432/184, 183, 224, 226; 138/97; 285/15, 41; 29/402.9, 402.16

[56] References Cited

U.S. PATENT DOCUMENTS

| | | | |
|---|---|---|---|
| 1,971,387 | 8/1934 | Scoville | 219/38 |
| 2,721,823 | 10/1955 | Hopkins et al. | 138/97 |
| 2,809,265 | 10/1957 | Jackson | 432/225 |
| 3,032,870 | 5/1962 | Rohrberg et al. | 29/479 |
| 3,074,704 | 1/1963 | Ronay | 432/225 |
| 3,412,233 | 11/1968 | Wilkie | 219/230 |
| 3,464,617 | 9/1969 | Raynes et al. | 228/253 |
| 3,482,080 | 12/1969 | Kassen | 219/535 |
| 3,519,023 | 7/1970 | Burns et al. | 138/33 |
| 3,590,206 | 6/1971 | Lago | 219/85 |
| 3,633,266 | 1/1972 | Taylor | 29/488 |
| 3,776,689 | 12/1973 | Mayo et al. | 432/183 |
| 4,089,453 | 5/1978 | Jenkins | 228/154 |
| 4,205,221 | 5/1980 | Meyer | 219/230 |
| 4,413,765 | 11/1983 | Tracy | 228/119 |
| 4,465,309 | 8/1984 | Nimke et al. | 228/152 |
| 4,552,183 | 11/1985 | Chick | 285/15 |

FOREIGN PATENT DOCUMENTS 0056192  4/1982  Japan ................................. 228/119

Primary Examiner—Nicholas P. Godici
Assistant Examiner—Karen Skillman
Attorney, Agent, or Firm—Thomas & Kennedy

[57] ABSTRACT

Breached copper pipes are repaired by wrapping a solder coated strip of copper about the pipe, mounting a multiple section heat jacket about the pipe over the strip, and heating the heat jacket with a torch or an electrical heating element inserted into a channel formed in the jacket.

5 Claims, 3 Drawing Figures 4,673,122

METHOD AND APPARATUS FOR REPAIRING COPPER PIPES

TECHNICAL FIELD

This invention relates to methods and apparatuses for repairing copper pipes such as those commonly used as water conduits in residential and commercial buildings.

BACKGROUND OF THE INVENTION

Copper pipes are widely used today as water conduits in residential and commercial buildings. Though they are normally well suited for this purpose, when they are filled with water in subfreezing conditions they become susceptible to rupturing or bursting when frozen water within them later melts and expands.

The most prevalent manner in which ruptured copper pipes are repaired is that known as sweat soldering. This is the same procedure generally used in joining pipes together in initially constructing a network of conduits to service as water lines. To sweat solder adjacent ends of two copper pipes together a copper sleeve is positioned over their ends so as to bridge the spacial gap between them. Solder is then applied about both ends of the sleeve and heated, as with an open flame, whereupon the solder melts and flows beneath and about the sleeve ends between the ends of the sleeves and the underlying pipes once the solder cools and solidifies a water-tight joint results. One such sweat joint is shown in U.S. Pat. No. 3,464,617.

As previously stated, the just described procedure is also used to repair previously constructed pipes that have become ruptured or fractured as from the effects of freezing. To repair such a ruptured pipe a plumber will ordinarily cut and remove the breached portion of the pipe. By doing this the plumber has, in effect, substantially reestablished a normal construction situation where the ends of two pipes are placed closely together in preparation for being initially joined by the sweat solder procedure previously discussed. In the case of a ruptured pipe, however, care must be exercised to remove all water from the area of the breach. Where residual water is present during the construction of the sweat joint, the water tends to cool the pipe while the solder is being heated thereby making it difficult to form a good solder joint. Residual water is normally removed from this area, after the pipe has been drained, by heating the pipe with a torch to evaporate the water.

The just described procedure commonly used in repairing broken copper pipes consumes a substantial period of time since the breached portion of the pipe must be severed and removed, a sleeve positioned so as to bridge the gap formed by the removed section, and a solder joint formed on each end of the sleeve. The labor involved in removing residual water can be quite substantial, particularly where the pipe is in a relatively low area since water tends to drain to the area of repair from adjacent higher portions of the pipe as the water in this area is removed. In addition, it is often difficult to set the sleeve in place since one pipe end must be moved momentarily out of axial alignment with the other pipe end in order to pass the sleeve initially over one of the pipe ends. Though during initial construction this may have presented no problem since the pipes were not yet completely hung, for repair a mounting bracket may have to be temporarily removed.

It thus is seen that a need remains for apparatuses and methods for repairing broken copper pipes that overcome or at least ameliorate the just described problems. It is to the provision of such that the present invention is primarily directed.

SUMMARY OF THE INVENTION

In one form of the invention, apparatus for repairing copper pipes comprises a strip of solder coated copper adapted to be wrapped about a breached portion of a pipe to be repaired, and a heat jacket having a plurality of elongated sections with each jacket section defining a portion of a cylindrical jacket bore. The apparatus also includes fastening means for fastening the heat jacket sections together about the breached portion of the pipe and copper strip.

In another form of the invention, apparatus for repairing copper pipes comprising a first heat jacket section of a semi-annular elongated shape having two parallel threaded holes formed in two planar opposite side faces thereof. The apparatus includes a second heat jacket section of a generally semi-annular elongated shape having two steps formed in opposite sides over two coplanar opposite side faces thereof. Two parallel bolt receiving holes extend from the side steps to the side faces of the second section. The apparatus further comprises a strip of solder coated copper adapted to be wrapped about a breached portion of the pipe to be repaired and two bolts adapted to be passed through the bolt receiving holes in the second heat jacket section and threaded into the threaded holes of the first heat jacket section.

In yet another form of the invention material for use in repairing breached copper pipes comprises a strip of solder coated copper.

In still another form of the invention a method of repairing in situ a copper pipe having a breached portion comprises the steps of wrapping a strip of solder coated copper about the breached portion with the solder in direct contact with the pipe. A metallic heat jacket is secured about the strip wrapped breached portion of the pipe. The heat jacket is heated for a period of time sufficient to bond the strip to the pipe. The heat jacket is then removed from the pipe.

DETAILED DESCRIPTION

Figures 1, 2, 3:
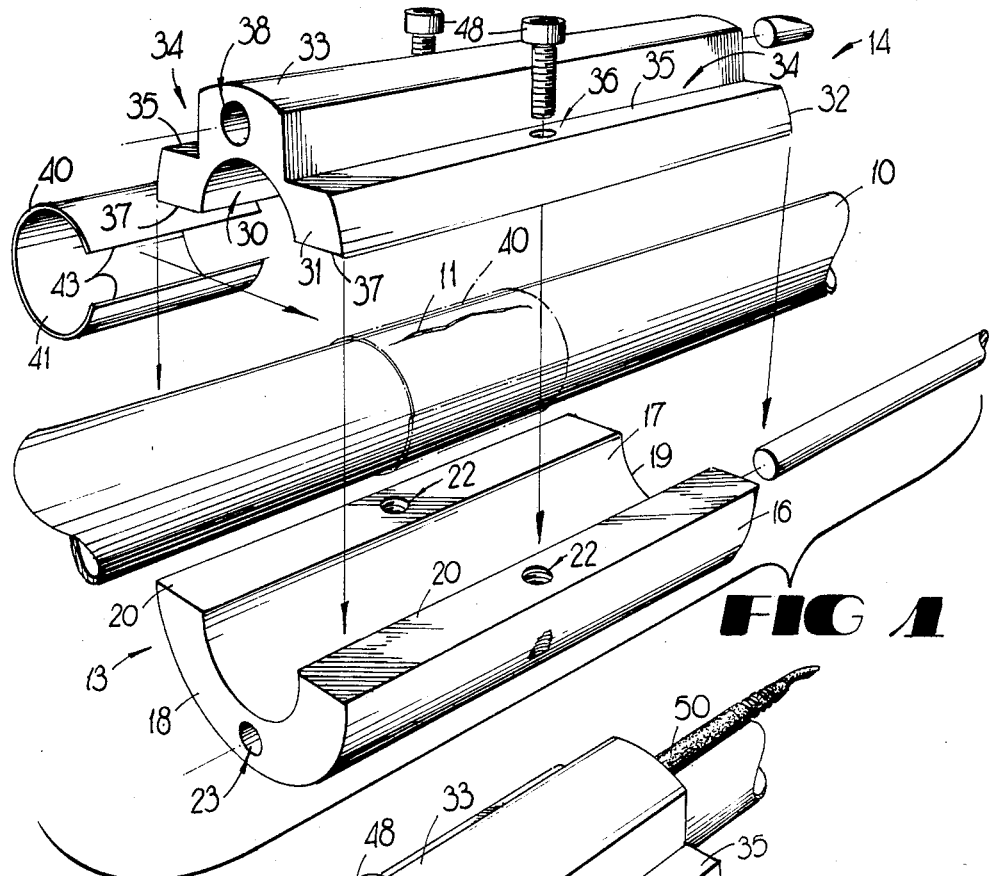
FIG. 1 is an exploded view of apparatus embodying principles of the present invention shown positioned about a breached portion of a copper pipe in preparation for repairing the pipe in accordance with a method of the invention.
FIG. 2 is a perspective view of the apparatus illustrated in FIG. 1 shown mounted to a pipe and with heating elements inserted into opposite sides thereof and with shims placed about the pipe within the apparatus.
FIG. 3 is a perspective view of the section of the pipe shown in FIG. 1 after having been repaired in accordance with principles of the invention.

With reference next to the drawing, there is shown a copper pipe 10 such as a type M copper pipe commonly used for water conduits in residences and commercial building. The two most prevalent sizes in use today is that of a ⅞ inch outside diameter and ¾ inch inside diameter pipe and that of a ⅝ inch outside diameter and ½ inch inside diameter pipe. The pipe 10 is of the larger size and is seen to be breached at a fracture or rupture 11 and thus in need of repair. The apparatus for repairing the breached pipe comprises an aluminum heat jacket having a first section indicated generally at 13 and a second section indicated generally at 14. The first heat jacket section 13 is of a semi-annular elongated shape having a semi-cylindrical exterior 16 and a semi-cylindrical interior bore defining wall 17. The section has two semi-annular, flat end walls 18 and 19, and two coplanar flat side faces 20. The jacket section 13 is also provided with two parallel threaded holes 22 that are formed in the side faces 20. The section further has a cylindrical channel 23 that extends completely from one end wall 18 to the other end wall 19 so that both ends of the channel open to ambience.

The second heat jacket section 14 is also of a generally semi-annular elongated shape having a semi-cylindrical bore defining interior wall 30, two semi-annular flat end walls 31 and 32, and an exterior wall 33 formed with two steps indicated generally at 34. The steps have coplanar flat side faces 35 in which two parallel bolt receiving holes 36 extend to two coplanar flat side faces 37. The section 14 also has a cylindrical channel 38 that extends from one end wall 31 to the other end wall 32 so as to be open at each section end to ambience. The diameter of the bore of the combined jacket section here approximately matches the O.D. size of the larger of the two most popular copper pipes.

The apparatus further includes a thin flexible strip or tape of copper 40 having a coating of solder 41 formed all over one surface thereof. The copper strip here is 20 mils thick while the solder coating here measures 6 mils thick. The solder preferably consists of 50% tin and 50% lead, by weight. The tape or strip is formed by cleaning and fluxing, as with zinc chloride or ammonium chloride, one side of copper shimstock and then coating the flexed side only with melted solder. The length of the strip is sufficient to be wrapped completely about the pipe to be repaired so that its edges 43 touch or come close to touching one another. A pair of semi-cylindrical aluminum shims 45 is provided, as shown in FIG. 2, whereby the same heat jacket sections 13 and 14 may be used for repairing a smaller size pipe 10′. Two bolts 48 are also provided of a size to be passed through the holes 36 in jacket section 14 and threaded into the threaded holes 22 in jacket section 13 as with the use of an Allen head wrench. Finally, the apparatus includes an elongated electric heating element 50 that may be inserted into either end of either of the channels 23 and 38. Although two such elements are shown in FIG. 2, normally a single element will suffice.

To repair the pipe 10 or 10′, shown breached at fracture 11 in FIG. 1, the pipe is drained of water and the area of the breach smoothed, as with a file or sandpaper, and fluxed. The strip of solder coated copper is then wrapped snuggly about the breached portion and covered with the two heat jacket sections. Bolts 48 are then passed through the holes 36 in the jacket section 14 and threaded into the threaded holes 22 in the jacket section 13 thereby fastening the two sections tightly about the breached portion of the pipe with the strip of solder coated copper sandwiched between the jacket and pipe. Since the size of the jacket bore is substantially the same as that of the pipe, a snug fit is assured before confronting side faces of the two sections contact each other in view of the presence of the strip of copper. In the event the pipe is of the smaller size, shims 45 are inserted over the pipe prior to or in conjunction with the mounting of the heat jacket and strip as shown in FIG. 2.

Next the jacket is heated by either the use of a propane torch or with the use of one of the electrical heating elements 50. Where the heating element is used it is inserted into the more accessible of the two channels and into the more accessible end of that particular channel. The electrical heating element is then energized whereupon the heat jacket, pipe section and solder coated strip of copper become heated. With the use of a electric Chromlax heating element made by Applebee Corp. of Atlanta, Ga., the strip of copper has been found to become well bonded to the pipe in approximately 6½ minutes. Where an open flame torch is used the time for good bonding has been found to be 8 minutes. Surprisingly, residual water in the area of the breach does not present the problem that it does with sweat joint procedures.

The just described method using the apparatus illustrated has been found to repair pipes in a highly effective and efficient manner with a minimal amount of time and labor. The resulting repair has been found to be of sound integrity. The method and apparatus avoids the need for cutting a section from a breached pipe and inserting a sleeve so as to bridge the cutout section. That the heat jacket section is in two or more sections enables it to be easily mounted about the pipe even through the breached portion of the pipe may be located in a difficult area to reach. That four open ended channels are made available for the insertion of an electric heating element also facilitates repair. Although normally the heating element is not inserted into the heat jacket until the jacket has been mounted, it may, of course, be inserted into one of the jacket sections prior to or in conjunction with the assembly of the jacket itself about the pipe.

It thus is seen that a method and apparatus for repairing broken copper pipes is provided which greatly facilitates repair over the procedures of the art. It should be understood, however, that the just described embodiments merely illustrate principles of the invention in preferred forms. Many modifications, additions and deletions may be made thereto without departure from the spirit and scope of the invention as set forth in the following claims.

I claim:

1. Apparatus for repairing copper pipes comprising, in combination, a strip of solder coated copper adapted to be wrapped about a breached portion of a pipe to be repaired; a heat jacket having a plurality of elongated sections with each jacket section defining a portion of a cylindrical jacket bore and wherein at least one of said heat jacket sections is formed with an open ended elongated channel; an elongated electric heating element of a size and shape for removable insertion into said channel from the exterior of said jacket, and fastening means for fastening said heat jacket sections about the pipe.

2. The apparatus of claim 2 wherein said channel extends from one end of said heat jacket section to an opposite end whereby it is accessible from opposite ends of the jacket section.

3. Apparatus for repairing copper pipes comprising, in combination, a strip of solder coated copper adapted to be wrapped about a breached portion of a pipe to be repaired; a heat jacket consisting essentially of two jacket sections with each jacket section defining a portion of a cylindrical jacket bore and is formed with a channel that extends from one section end to another section end adjacent said bore portion, an elongated electric heating element of a size and shape for removable insertion into either one of said section channels from either channel end, and fastening means for fastening said heat jacket sections about the pipe.

4. Apparatus for repairing copper pipes comprising a first heat jacket section of a semi-annular elongated shape having two parallel threaded holes formed in two planar opposite side faces thereof; a second heat jacket section of a generally semi-annular elongated shape having two steps formed in opposite sides over two coplanar opposite side faces thereof and two parallel bolt receiving holes that extend from said side steps to said two side faces, at least one of said heat jacket sections is formed with an open ended elongated channel from the exterior of said jacket; a strip of solder coated copper adapted to be wrapped about a breached portion of a pipe to be repaired, two bolts adapted to be passed through said bolt receiving holes in said second heat jacket section and threaded into said thread holes of said first heat jacket section, and an elongated electric heating element of a size and shape for removable insertion into said jacket section channel.

5. The apparatus of claim 4 wherein said channel extends from one end of said heat jacket section to an opposite end thereof whereby it is accessible from each section end.

* * * * *